United States Patent [19]

Kuerschner et al.

[11] Patent Number: 4,811,224

[45] Date of Patent: Mar. 7, 1989

[54] BLOCKING CIRCUIT FOR TRANSMISSION SHIFTING RESPONSIVE ENGINE TORQUE REDUCER

[75] Inventors: Michael Kuerschner, Stuttgart; Gunter Juergens, Waiblingen; Albrecht Greiner, Stuttgart, all of Fed. Rep. of Germany

[73] Assignee: Daimler-Benz Aktiengesellschaft, Stuttgart, Fed. Rep. of Germany

[21] Appl. No.: 848,827

[22] Filed: Apr. 7, 1986

[30] Foreign Application Priority Data

Apr. 6, 1985 [DE] Fed. Rep. of Germany ....... 3512603

[51] Int. Cl.<sup>4</sup> ............................................. B60K 9/00
[52] U.S. Cl. .............................. 364/424.1; 364/431.08; 123/419; 74/866
[58] Field of Search ................ 364/424.1, 431.08, 511; 74/866; 123/419, 415, 436; 180/197; 73/116, 117.4, 862.36

[56] References Cited

U.S. PATENT DOCUMENTS

| 4,370,904 | 2/1983 | Müller et al. | 74/866 |
| 4,403,527 | 9/1983 | Mohl et al. | 74/858 |
| 4,501,171 | 2/1985 | Muller et al. | 74/866 |
| 4,704,541 | 11/1987 | Leiber | 180/197 |

FOREIGN PATENT DOCUMENTS 3018033 11/1981 Fed. Rep. of Germany .
2842389 4/1984 Fed. Rep. of Germany .

Primary Examiner—Parshotam S. Lall
Assistant Examiner—Ellis B. Ramirez
Attorney, Agent, or Firm—Barnes & Thornburg

[57] ABSTRACT

A device is provided for reducing the engine torque when shifting up a change-speed gear transmission connected downstream of an internal combustion engine. A final control element for influencing the engine torque is connected to a control circuit and causes a reduction in the engine torque only in the full load range of the internal combustion engine and only above a limit value of the negative changes in engine speed over time. Comparator circuits for positive changes in speed over time are connected to the final control element such that the reduction in engine torque is blocked above a limit value of the positive changes in speed over time. In this way, overshoots triggered by positive changes in speed over time cannot result in a reduction in the engine torque.

11 Claims, 1 Drawing Sheet

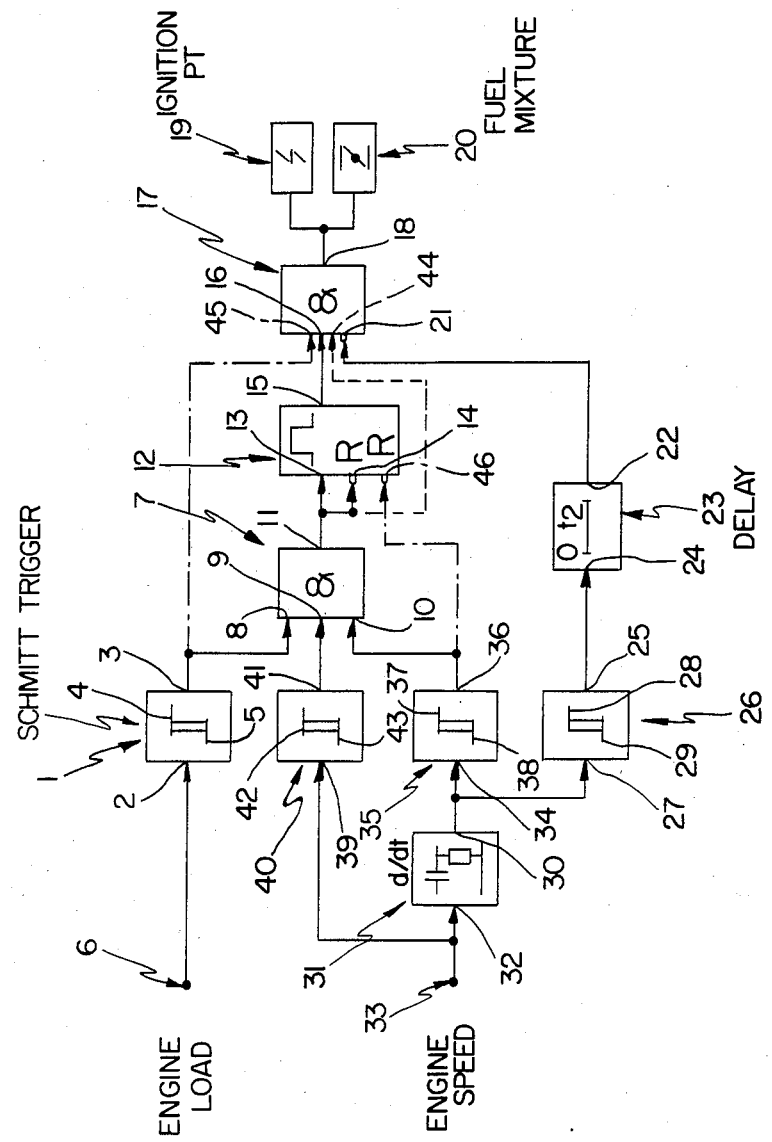

BLOCKING CIRCUIT FOR TRANSMISSION SHIFTING RESPONSIVE ENGINE TORQUE REDUCER

BACKGROUND AND SUMMARY

The invention relates to a device for reducing engine torque during shifting between gears in a gear transmission driven by the engine. Especially preferred embodiments of the invention include devices of this kind which are responsive only to engine speed and engine load conditions.

In such devices, the control expenditures are minimized because a switching signal from the gear is dispensed with and a shift operation is detected solely from the speed behavior, i.e. from the drop in speed of the internal combustion engine occurring when there is an up-shift. Also because the reduction in engine torque is limited to the full load range, at the high speeds of which the negative change in speed over time, which does not occur until during the up-shift, is relatively high and consequently is easier to measure. In a known device described in German Published Unexamined Application (DOS) No. 3,018,033 and corresponding to U.S. Pat. No. 4,370,904 overshoots which are produced from positive changes in speed over time and which may result in unintentional reduction in engine torque are not considered.

In a known device of another type described in German Patent Specification No. 2,842,389, the controlled variable causing the final control element to reduce the engine torque with a fixed delay occurs at the output of a timing element, the operating time of which is dependent on the engine load and, in addition, is zero if the engine speed is less than a limit value of, for example, 3000 rpm. When the limit value is exceeded, the operating time increases linearly with the speed. The set input of the timing element is connected to the output of an AND element, with which a signal occurs at one of its two inputs if a comparator circuit has detected that the engine speed is decreasing. At the other input, a signal occurs if the operating time has elapsed of a second timing element which is activated via its set input when an upshift occurs. Both timing elements are directly reset if a shift detection stage has recognized that a downshift is concerned. With this device, it is intended to achieve a reduction in jerky changes in speed, and thus the jerk in shifting, when a shift command occurs, whereby a minimum possible wear of the friction elements of the automatic change-speed gear is the aim.

Apart from the fact that a reduction in wear cannot be achieved to the desired extent in this known device because the reduction in engine torque cannot commence until after elapse of the operating time of the second timing element activated by the up-shift signal, the control effort or expenditure is high because, not only the control means dependent on the operating parameters of the internal combustion engine are necessary, but also control means for the processing and detection of gear shift signals are necessary.

An object on which the invention is based is the designing of a device of the generic above-described type with minimum possible effort and expenditure, such that the heat generation in the friction elements is decreased by a reduction in engine torque which is not to be perceived by the driver—in other words to be carried out within the operating time. However, it is to be avoided thereby that an unintended reduction in engine speed is triggered by overshoots, for example after sudden full acceleration out of the partial load range.

This object is achieved according to the invention by the provision of blocking circuit devices for blocking the engine torque reduction in response to detected positive rates of change over time of engine speed above predetermined values.

In the devices constructed according to preferred embodiments of the invention, overshoots with negative changes in speed over time, which may assume values which correspond to the values of a negative change in speed over time which also occur with up-shifts, are eliminated in their influence on the speed-dependent control means by monitoring of the positive changes in speed over time and blocking of the final control element for influencing the engine torque when critical acceleration values occur.

The blocked state with regard to the possibility of reducing the engine torque, triggered by such overshoots with initially positive change in speed over time in the devices constructed according to the invention are limited in time in accordance with certain preferred embodiments. However, the blocked state should last at least approximately for half a period of oscillation of the drive train natural frequency according to especially preferred embodiments of the invention.

Further objects, features, and advantages of the present invention will become more apparent from the following description when taken with the accompanying drawings which show, for purposes of illustration only, several embodiments in accordance with the present invention.

BRIEF DESCRIPTION OF THE DRAWINGS

The single drawing FIGURE is a schematic block circuit diagram depicting a control circuit constructed in accordance with preferred embodiments of the invention for controlling the reduction of engine torque in response to shifting between gears of a vehicle transmission.

DETAILED DESCRIPTION OF THE DRAWINGS

In the drawings, only the control circuits for controlling engine torque are depicted, the details of the engine and transmission to which they relate being considered within the skill or the art. Further, the disclosure of copending commonly owned application Ser. No. 848,826, filed on even date herewith, and based on German Priority Application No. P 35 12 604.3 filed Apr. 6, 1985 in Germany, is incorporated herein by reference thereto, said application schematically depicting a transmission arrangement of the type the present invention is concerned with.

In the first embodiment, drawn in solid lines, a Schmitt trigger 1 is connected via its input 2 to a connection terminal 6 which carries a signal flow dependent on the engine load of the internal combustion engine. At the output 3 of the Schmitt trigger 1 an output signal occurs if the engine load reaches or exceeds an upper limit value 4—which may correspond, for example, to an intake pipe vacuum of 800 mbar. The output signal does not occur or ceases if the engine load has dropped to a lower limit value 5 which can lie, for example, 50 mbar below the upper limit value.

The output 3 of the Schmitt trigger 1 is in connection with an input 8 of an AND element 7, the output 11 of which is connected both to the set input 13 and to a negated reset input 14 of a monostable flip-flop 12 used as a timing element. The output 15 of the flip-flop 12 is in connection with an input 16 of a further AND element 17, the output 18 of which acts on a final control element 19, 20 for reducing the engine torque, which operates on an intervention element 19 for setting the ignition point and/or an intervention element 20 for controlling the fuel mixture supply of the internal combustion engine.

A further input 10 of the AND element 7 is in connection with the output 36 of a Schmitt trigger 35, the input 34 of which is connected to the output 30 of a differentiating element 31. The input 32 of element 31 is connected to a connection terminal 33 which carries a signal flow dependent on the speed of the internal combustion engine. The output 30 of the differentiating element 31 carries a signal flow dependent on the change in speed over time of the internal combustion engine. An output signal occurs at the output 36 of the Schmitt trigger 35 if the change in engine speed over time is negative and reaches or exceeds an upper limit value 37, which indicates an up-shift in the transmission driven by the engine and may be, for example, $=-600$ rpm per sec. The output signal is not applied or ceases if a lower limit value 38 of the negative change in speed over time, which may amount to 50 rpm per sec less than the upper limit value for example, is again reached or not exceeded.

A negated input 21 of the AND element 17 is in connection with the output 22 of a delay element 23, the input 24 of which is connected to the output 25 of a Schmitt trigger 26. The Schmitt trigger 26 is likewise in connection via its input 27 with the output 30 of the differentiating element 31. An output signal is applied to the output 25 of the Schmitt trigger 26 if the change in speed over time is positive and reaches or exceeds an upper limit value 28, which may be, for example, 2500 rpm per sec. The output signal ceases or is not applied if the positive change in speed over time reaches or does not exceed a lower limit value 29, which amounts to 50 rpm per sec less than the upper limit value 28 for example.

Finally, the AND element 7 is connected via a third input 9 to the output 41 of a fourth Schmitt trigger 40, which is likewise connected via its input 39 to the connection terminal 33. An output signal is applied to the output 41 of the Schmitt trigger 40 if the speed of the internal combustion engine reaches or exceeds an upper limit value 42, which may be, for example, 4000 rpm. The output signal ceases or is not applied if a lower limit value 43 is reached or not exceeded, which amounts to 200 rpm less than the upper limit value for example.

The operating time of the monostable flip-flop 12 may be set to $350 \times 10^{-3}$ sec.

A signal is applied to the output 22 of the delay element 23 if a signal is applied to the input 24 of the latter. The signal at the output 22 is still applied after the signal on the input side goes out for a time $t_2$, which may be $300 \times 10^{-3}$ sec.

The operating principle of the first embodiment described above is as follows:

If the operating point of the internal combustion engine is not in the full load range, the AND element 7 is ineffective with respect to the timing element 12 and thus also to the final control element 19, 20, irrespective of whether or not an up-shift is indicated at the output 36 of the Schmitt trigger 35 by the occurrence of an output signal, because a signal cannot be applied, at least to one of its two other inputs 8 and 9.

If, however, the internal combustion engine is being operated in the full load range, an input signal is applied to each of the two inputs 8 and 9 of the AND element 7, so that in the case of an up-shift—in which a signal is also applied to the third input 10—the timing element 12 is activated, whereby the final control element 19, 20 is caused, via the second AND element 17, to reduce the engine torque over the period fixed by the timing element 12 within the duration of the up-shift. This function of the final control element 19, 20 is only made possible, however, if a signal is applied to the negated input 21 of the AND element 17, which is in fact always the case as long as the Schmitt trigger 26 does not supply an output signal.

If a positive change in speed over time occurs which reaches or exceeds the upper limit value 28 of the Schmitt trigger 26, the signal occurring at the output 25 of the latter activates the delay element 23, whereby the input signal at the negated input 21 of the AND element 17 is cancelled for at least the time $t_2$ of the delay element 23 and thus the function of the final control element 19, 20 with respect to reducing the engine torque is blocked, to be precise irrespective of whether or not an up-shift is taking place.

This immediate blocking of the function of the final control element 19, 20 is also caused when the timing element 12 is activated with an up-shift but the output signal of the AND element 7 ceases during its operating time. In this case, a signal is applied to the negated reset input 14 of the timing element 12, so that the output signal of the timing element 12 immediately ceases and the final control element 19, 20 is blocked or reset to its position for non-reduced engine torque. This blocking may thus occur if either one input or two inputs or all three inputs 8, 9, 10 at the AND element 7 are without a signal.

The just described blocking of the function of the final control element 19, 20 in an up-shift with running timing element 12 by changes at the inputs of the AND element 7 is also the subject-matter of each of the three further embodiments described below.

The second embodiment differs from the first embodiment merely in that the output 11 of the AND element 7 is not connected to the negated reset input 14 of the timing element 12, but to a third input 44 of the AND element 17. In this way, an indirect resetting or blocking of the final control element 19, 20 is likewise achieved, despite running timing element 12, if a signal drops at one or more inputs of the AND element 7.

The third embodiment differs from the first embodiment merely in that not the output 11 of the AND element 7, but one or two or all three of its inputs 8, 9, 10 are each connected to a negated reset input 46—this is drawn only for the input 10—of the timing element 12. In this way, during an up-shift with activated timing element 12, at a reset input 46 of the latter a signal resulting in the immediate blocking or resetting of final control element 19, 20 occurs if a change takes place at one or more inputs 8, 9, 10 of the AND element 7.

Again the same blocking effect is achieved in the fourth embodiment as well, because this differs from the first embodiment only in that not the output 11 of the AND element 7 is connected to a negated reset input 14 of the timing element 12, but one or two or all three inputs 8, 9, 10 are each connected to an input of the AND element 17—this is drawn only for the connection of input 8 of the AND element 7 to an associated input 45 of the AND element 17. In this embodiment as well, a signal causing the final control element 19, 20 to reduce the engine torque only occurs at the output 18 of the AND element 27, in spite of running timing element 12, if a signal is applied to all three inputs 8, 9, 10 of the AND element 7.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed:

1. Control apparatus for generating engine control signals in response to gear shift changes in a speed change gear transmission, said control apparatus comprising:
    torque reduction control circuit means responsive to at least one of engine load and engine speed conditions for generating a torque reduction control signal to initiate engine torque reduction during certain predetermined ranges of said at least one of engine load and engine speed conditions, and
    engine torque reduction blocking circuit means for blocking generation of the torque reduction signal when the positive rate of change in engine speed is above a Predetermined value.

2. Control apparatus according to claim 1, wherein said engine torque reduction blocking circuit means includes time delay element means for limiting the blocking in time.

3. Control apparatus according to claim 1, wherein said torque reduction control circuit means includes means for limiting generation of the torque reduction control signal to full load engine conditions.

4. Control apparatus according to claim 3, wherein said torque reduction control circuit means includes means for limiting generation of the torque reduction control signal to negative engine speed changes over time that are above a predetermined limit value.

5. Control apparatus according to claim 1, wherein said blocking circuit means includes:
    a differentiating means for generating an ouptut signal representative of the engine speed rate of change over time, and
    control trigger means supplied by the output of the differentiation means and operative to generate an output signal when said engine speed rate of change is above a first predetermined value and to cease said output signal when said engine speed rate of change is below a second lower predetermined value, the output of the control trigger means being supplied as a torque reduction blocking signal to block the reduction of torque by the control circuit means.

6. Control apparatus according to claim 5, further comprising a time delay means interposed in the output of the control trigger means to delay the torque reduction blocking signal a predetermined time period.

7. Control apparatus according to claim 1, wherein said control circuit means includes a first AND element having said torque reduction control signal as an output signal and having a first input signal from said torque reduction blocking circuit means, said first input signal being a negative signal blocking an output signal from the first AND element.

8. Control apparatus according to claim 7, wherein said engine torque reduction blocking circuit means includes time delay element means for limiting the blocking in time.

9. Control apparatus according to claim 7, wherein said control circuit means comprises:
    a second AND element having an output which is a second input to the first AND element, said second AND element having one input connected to an output of a first Schmitt trigger, said first Schmitt trigger output being dependent on negative changes in engine speed over time above a predetermined value,
    wherein said torque reduction blocking circuit means includes a second Schmitt trigger having its output connected as the first input signal to the first AND element, said second Schmitt trigger output being dependent on positive changes in engine speed over time above a predetermined value.

10. Control apparatus according to claim 4, wherein a time delay element is interposed between the second Schmitt trigger and the first AND element.

11. Control apparatus according to claim 4, further comprising timing element flip-flop means interposed between the output of the second AND element and the input to the first AND element, said timing element including a set element input and a reset element input connected to the output of the second AND element.

* * * * *